United States Patent
Faasse

(10) Patent No.: US 8,966,296 B2
(45) Date of Patent: Feb. 24, 2015

(54) TRANSITIONING A PERFORMANCE STATE OF A PROCESSOR

(75) Inventor: Scott P. Faasse, Tomball, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 360 days.

(21) Appl. No.: 13/550,669

(22) Filed: Jul. 17, 2012

(65) Prior Publication Data

US 2014/0025937 A1    Jan. 23, 2014

(51) Int. Cl.
*G06F 1/00* (2006.01)
*G06F 1/32* (2006.01)

(52) U.S. Cl.
USPC ............ 713/300; 713/320; 713/322; 713/323; 714/47.1; 702/182

(58) Field of Classification Search
CPC .... G06F 1/3203; G06F 1/3206; G06F 1/3243
USPC ................. 713/300, 320, 322, 323; 714/47.1; 702/182
See application file for complete search history.

(56) References Cited

U.S. PATENT DOCUMENTS

| | | | |
|---|---|---|---|
| 7,536,567 B2 | 5/2009 | Bonola | |
| 7,917,789 B2 | 3/2011 | Fenger | |
| 8,001,407 B2 | 8/2011 | Malone | |
| 8,024,590 B2 | 9/2011 | Song | |
| 8,112,250 B2 | 2/2012 | Floyd | |
| 2009/0164812 A1* | 6/2009 | Capps et al. | 713/320 |
| 2011/0093734 A1 | 4/2011 | Burchard | |

OTHER PUBLICATIONS

Rajamani et al., Application-Aware Power Management, IEEE 2006 (10 pages).

* cited by examiner

*Primary Examiner* — Michael J Brown
(74) *Attorney, Agent, or Firm* — Trop, Pruner & Hu, P.C.

(57) ABSTRACT

A processing circuit independent of a processor determines a current utilization of the processor, based on events of an execution pipeline of the processor. According to the determined utilization, the processing circuit causes the processor to transition from a first of the plurality of performance states to a second of the plurality of performance states.

18 Claims, 3 Drawing Sheets

TRANSITIONING A PERFORMANCE STATE OF A PROCESSOR

BACKGROUND

An electronic device can include a processor and other components. In some examples, the processor is capable of operating at multiple performance states, where at least one of the performance states is at a higher performance level than another of the performance states. When a workload to be executed by the processor is relatively low, the processor can be transitioned to a lower performance state to reduce power consumption. On the other hand, if the workload of the processor is relatively high, the processor can be transitioned to a higher performance state to meet performance demands of the workload.

BRIEF DESCRIPTION OF THE DRAWINGS

Some embodiments are described with respect to the following figures.

DETAILED DESCRIPTION

Traditionally, performance state control for a processor (for transitioning the processor among various different performance states) of an electronic device (e.g. a desktop computer, a notebook computer, a tablet computer, a server computer, a smartphone, a personal digital assistant, a gaming appliance, etc.) can be performed by a module (e.g. driver) of an operating system, or by an application. In other examples, performance state control for a processor can be performed by Basic Input/Output System (BIOS) code (or other type of boot code). However, performance state control by the operating system, application, or BIOS code can increase processing overhead at the processor, since the foregoing types of code are run on the processor. Consuming processing cycles to perform performance state control takes away processing resources (in the form of execution cycles of the processor) from application workload or other processor workload to be executed by the processor. This can lead to overall reduced performance of the electronic device.

In accordance with some implementations, instead of performing performance state control using code running on the processor, performance state control can instead be performed by a performance state control module running in a management controller.

A performance state of a processor is determined by at least one input parameter that affects an execution speed of the processor. Examples of such parameter can include any one or a combination of the following: a power supply voltage to the processor, and a frequency of a clock signal to the processor. In other examples, other parameters can affect the execution speed of the processor. A higher supply voltage level and a higher frequency of the clock signal can lead to increased processor execution speed, while a lower supply voltage level and a lower frequency of the clock signal can lead to a reduced processor execution speed. In some implementations, the multiple performance states (two or more performance states) of the processor can be determined by setting different combinations of supply voltage levels and clock signal frequencies.

In some examples, the performance states at which a processor can execute can include performance states defined by the Advanced Configuration Power Interface Specification (ACPI). In other examples, the processor performance states can be according to other protocols, or can be according to a proprietary technique of a given vendor of the electronic device.

Figure 1:
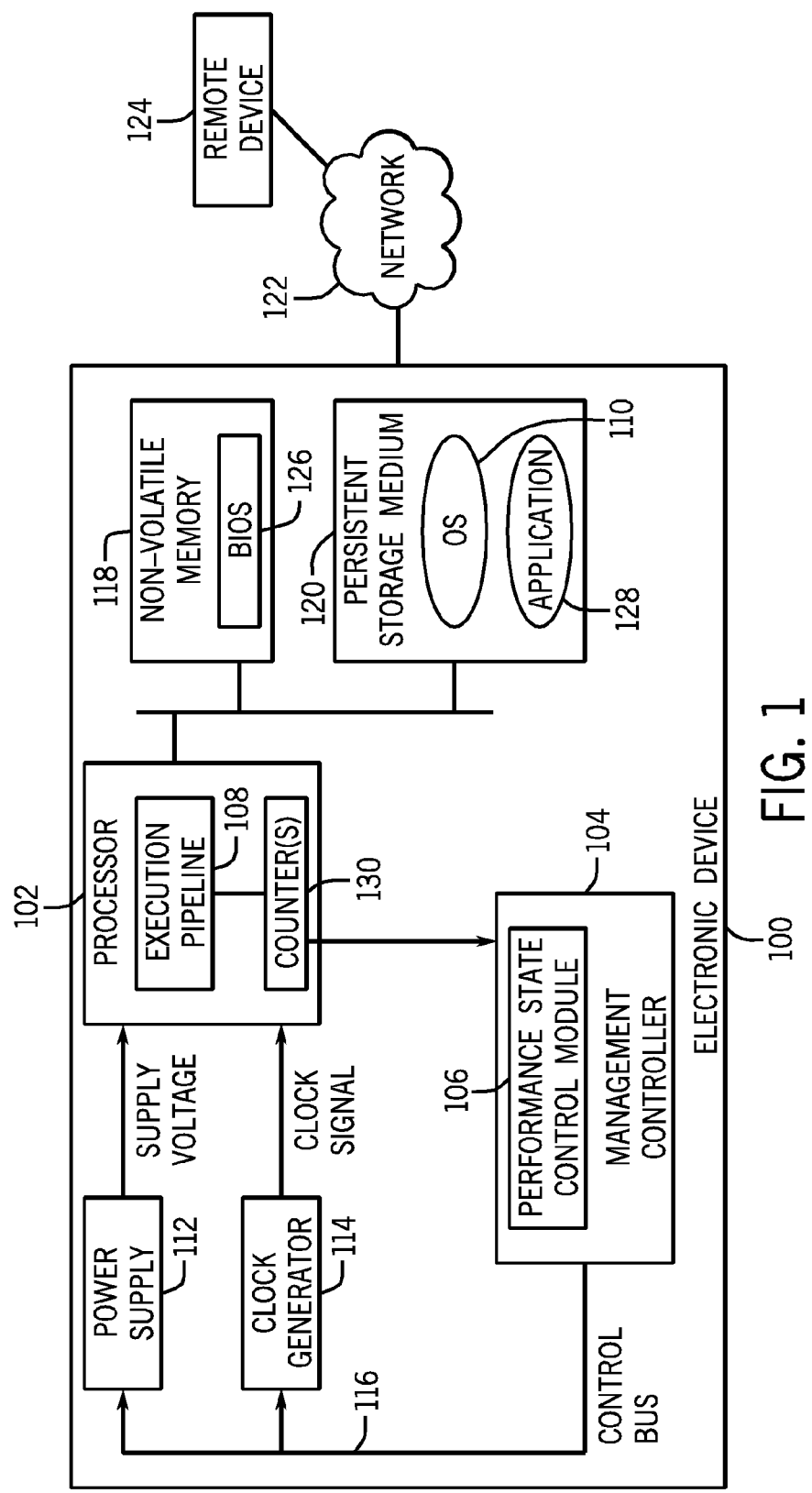
FIG. 1 is a block diagram of an example electronic device that includes a performance state control module executable in management controller according to some implementations.

FIG. 1 depicts an example arrangement of an electronic device 100, which includes a processor 102 and a management controller 104 that is independent of the processor 102. A performance state control module 106, which can be implemented with machine-readable instructions (such as firmware or software), is executable in the management controller 104 to control the transitioning of the processor 102 among two or more performance states.

The processor 102 can be a stand-alone processor chip that has processing logic (including an execution pipeline 108) to execute program code. A "chip" can refer to an integrated circuit package that has circuitry and the associated packaging that encapsulates the circuitry. The execution pipeline 108 can refer to an execution stage (or an arrangement of multiple execution stages) used to execute instructions corresponding to a workload of the processor 102. Instructions of the processor workload are provided to the execution pipeline 108, which executes the instructions based on scheduling performed by scheduling logic (not shown) of the processor 102.

In alternative implementations, the processor 102 can be a processor core within a processor chip. In some examples, a processor chip can have multiple processor cores; in such examples, the processor 102 can represent one of these processor cores.

The management controller 104 can be implemented as a processing circuit that is separate from the execution pipeline 108 of the processor 102. In some examples, the processor 102 is implemented as a processor chip, while the management controller 104 is implemented as a separate integrated circuit chip, such as an application-specific integrated circuit (ASIC) chip, a programmable gate array (PGA) chip, microcontroller, and so forth. In other examples, such as where the processor 102 is a processor core within a processor chip, the management controller 104 can be implemented as a processing circuit that is either on the same processor chip as the processor core, or can it be implemented as an integrated circuit chip that is separate from the processor chip.

The management controller 104 is thus considered to be "independent" of the processor 102 if either of the following is satisfied: (1) the processor 102 and the management controller 104 are implemented in separate chips; or (2) the processor 102 and the management controller 104 are provided on the same chip, but machine-readable instructions are executable on the management controller 104 that is separate from the execution pipeline 108 of the processor 102. Since the performance state control module 106 executes in the management controller 104 that is independent of the processor 102, the tasks of the performance state control module 106 does not take away execution cycles of the execution pipeline 108 from application workload (or other processor workload) that is performed by the processor 102. "Application workload" can refer to workload of one or multiple applications 128 that are executing in the electronic device 100. There can other types of processor workloads and can execute on the processor 102, such as workloads associated with an operating system 110 of the electronic device 100, workloads associated with diagnostic code (not shown) in the electronic device 100, and so forth.

In some implementations, a performance state of the processor 102 can be based on a combination of the following: (1) a supply voltage from a power supply 112 of the electronic device 100, and a frequency of a clock signal output by a clock generator 114 of the electronic device 100. A lower performance state of the processor 102 can correspond to a lower supply voltage level and/or a lower clock signal frequency. A higher performance state of the processor 102 can correspond to a higher supply voltage level and/or a higher clock signal frequency.

To control the performance state of the processor 102, the management controller 104 outputs corresponding control signals on a control bus 116 that is connected to control inputs of the power supply 112 and the clock generator 114. The control signals on the control bus 116 can cause the power supply 112 to vary (increase or decrease) the level of the supply voltage output by the power supply 112 and/or can cause the clock generator 114 to vary (increase or decrease) the frequency of the clock signal output by the clock generator 114.

Since the performance to control module 106 of the management controller 104 does not consume execution cycles of the processor's execution pipeline 108, overall processor performance in execution of the application or other workload of the processor 102 can be enhanced. Moreover, by implementing the performance state control module 106 as machine-readable instructions executable in the management controller 114, the performance state control module 106 can be updated when desired, such as to modify or improve the behavior of the performance state control module 106.

The machine-readable instructions of the performance state control module 106 can be stored in embedded non-volatile storage in the management controller 104. Alternatively, the machine-readable instructions of the performance state control module 106 can be initially stored in a non-volatile memory 118 (e.g. flash memory or other type of memory) or a persistence storage medium 130 (e.g. disk-based storage device or other type of storage device) of the electronic device 100. The machine-readable instructions of the performance state control module 106 that are stored in the non-volatile memory 118 or persistent storage medium 130 can be loaded into the management controller 104 for execution.

Updating the machine-readable instructions of the performance state control module 106 can be performed by using any one of the following techniques, depending upon where the machine-readable instructions of the performance state control module 106 are stored: (1) writing an updated version of the performance state control module 106 to the embedded storage of the management controller 104; (2) writing an updated version of the performance state control module 106 to the non-volatile memory 118; or (3) writing an updated version of the performance state control module 106 to the persistent storage medium 130. The updated version of the performance state control module 106 can be retrieved from a remote device 124, such as a remote server or other computing device, that is coupled to the electronic device 100 over a network 122. In another example, updating the performance state control module 106 can be performed as part of a process of updating machine-readable instructions (e.g. firmware) of the processor 102.

The non-volatile memory 118 of FIG. 1 can also store Basic Input/Output System (BIOS) code 126 (or other boot code). The BIOS code or other boot code is loaded for execution during initialization of the electronic device 100, to perform various boot-related tasks, including initialization of physical components of the electronic device 100, and the loading of the operating system 110 from the persistent storage medium 120. The persistent storage medium 120 also can store application code 128.

As further depicted in FIG. 1, the processor 102 can include one or multiple counters 130, which can be used for counting events of the execution pipeline 108 in the processor 102. Examples of events can include clock cycles or instruction cycles. For example, a counter can count a number of instructions retired (completed) by the execution pipeline 108. As other examples, a counter can count a number of clock cycles (or clock edges) during which the execution pipeline is executing an instruction, and/or a number of clock cycles (clock edges) during which the execution pipeline 108 is not executing an instruction, such as due to the execution pipeline 108 being halted or stalled by an external agent. Other types of events can be counted by the counter(s) 130 in other examples.

The output of the counter(s) 130 can be provided to the performance state control module 106. In some implementations, the counter(s) 130 in the processor 102 are configured to be accessible by the management controller 104 or other processing circuit that is separate from the execution pipeline 108. Content of the counter(s) 130 can be read by the management controller 104 without interrupting the execution pipeline 108. In alternative examples, signals relating to events of the execution pipeline 108 can be routed to counter(s) that are placed in closer proximity to the management controller 104, such as counter(s) in the management controller 104.

Alternatively, values derived from the output of the counter(s) 130 can be provided to the performance state control module 106. According to information based on the output of the counter(s) 130, the performance state control module 106 can decide to transition the processor 102 between different performance states. Such transition control is accomplished by the performance state control module 106 causing the management controller 104 to send corresponding control signals over the control bus 116 to the power supply 112 and/or clock generator 114.

Figure 2:
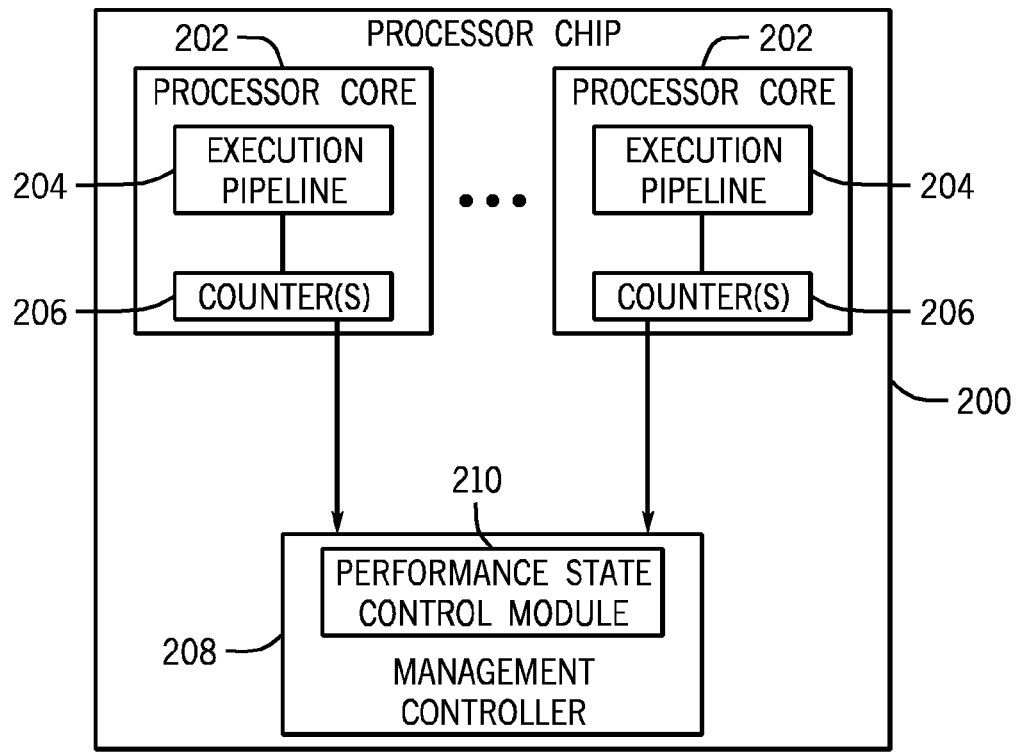
FIG. 2 is a block diagram of a processor chip that incorporates a performance state control module according to some implementations.

As noted above, in alternative implementations, instead of providing the management controller 104 as a chip that is separate from a processor chip, the management controller 104 and processor core(s) can be integrated onto a common processor chip, such as a processor chip 200 depicted in FIG. 2. As shown in FIG. 2, the processor chip 200 has multiple processor cores 202. Each of the processor cores 202 has a corresponding execution pipeline 204, and counter(s) 206 to count events of the execution pipeline 204.

A management controller 208 is provided on the same processor chip 200 as the processor cores 202. In the example of FIG. 2, one management controller 208 can be associated with the multiple processor cores 202. In other examples, multiple management controllers can be associated with respective processor cores. In FIG. 2, the counter values from the counters 206 of the processor cores 202 can be provided to the management controller 208, which executes a performance state control module 210 (similar to the performance state control module 106 of FIG. 1). In alternative examples, there can be multiple instances of the performance state control module 210 executing in the management controller 208 (or on corresponding multiple management controllers 208).

Figure 3:
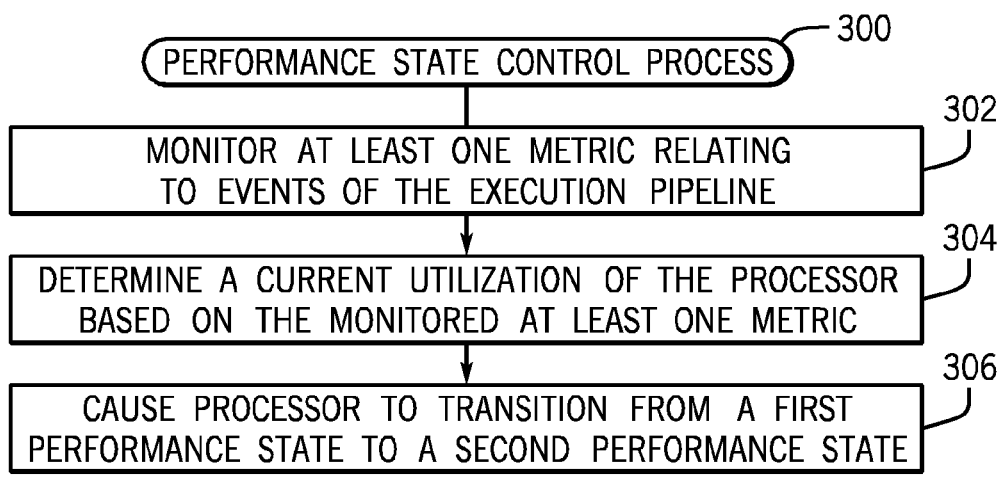
FIG. 3 is a performance state control process according to some implementations.

FIG. 3 is a performance state control process 300 according to some implementations. The process 300 can be performed by the performance state control module 106 or 210 of FIG. 1 or 2, for example. The process 300 monitors (at 302) at least one metric relating to events of a processor's execution pipeline 108 or 204, as shown in FIG. 1 or 2. The at least one metric can be count value(s) provided by the counter(s) 130 or 206.

Alternatively, the at least one metric can be calculated based on the count value(s) of the counter(s) 130 or 206. In some examples, metrics that can be used by the process 300 can include a ratio of a count of active clock cycles (clock cycles of the execution pipeline 108 or 204 during which instructions of a processor workload are executed) to inactive clock cycles (clock cycles of the execution pipeline 108 or 204 during which instructions of the processor workload are not executed), or some other metric.

This ratio can then be compared to a threshold (or multiple thresholds), and based on such comparing, the process 300 is able to determine (at 304) a current utilization of the processor 102. For example, if the ratio is greater than a predefined threshold, then that indicates a relatively high level of utilization of the processor 102; on the other hand, if the ratio is less than the predefined threshold, then that indicates a relatively low utilization of the processor 102. In other examples, more than two utilization levels can be specified based on specification of more than one predefined threshold. For example, if the ratio is less than a first threshold, then that can indicate low utilization. If the ratio is between a first threshold and a second threshold, then that can indicate a medium utilization. If the ratio is greater than the second threshold, then that can indicate a high utilization.

As another example, the at least one metric can be a ratio or a percentage that is computed by dividing a count of the number of actual instructions retired (completed) by the execution pipeline 108 or 204 by the maximum number of instructions that could have been retired (completed) within a given fixed time interval by the execution pipeline 108 or 204. More specifically, the at least one metric computed can be a relative ratio value that is based on differences in counter values between a current time interval and a past time interval. For example, a relative ratio R can be computed as follows:

$$R = [\text{RetInstr}_{actual}(t) - \text{RetInstr}_{actual}(t-1)] / [\text{RetInstr}_{maxI}(t) - \text{RetInstr}_{max}(t-1)],$$

where $\text{RetInstr}_{actual}(t)$ represents a count of a number of instructions retired in a current time interval t, $\text{RetInstr}_{actual}(t-1)$ represents a count of a number of instructions retired in a previous time interval t−1, $\text{RetInstr}_{maxI}(t)$ represents a maximum number of instructions that could have been retired in the current time interval t, and $\text{RetInstr}_{max}(t-1)$ represents a maximum number of instructions that could have been retired in the previous time interval t−1. The computed relative ratio R can be compared to one or multiple predefined thresholds to determine the current utilization (at 304).

According to the determined utilization, the process 300 causes (at 306) the processor 102 to transition from a first performance state to a second performance state. This can be accomplished by the management controller 104 transmitting control signals over the control bus 116 (FIG. 1) to the power supply 112 and/or clock generator 114, to set the corresponding supply voltage level and/or clock signal frequency of the target (second) performance state.

Figure 4:
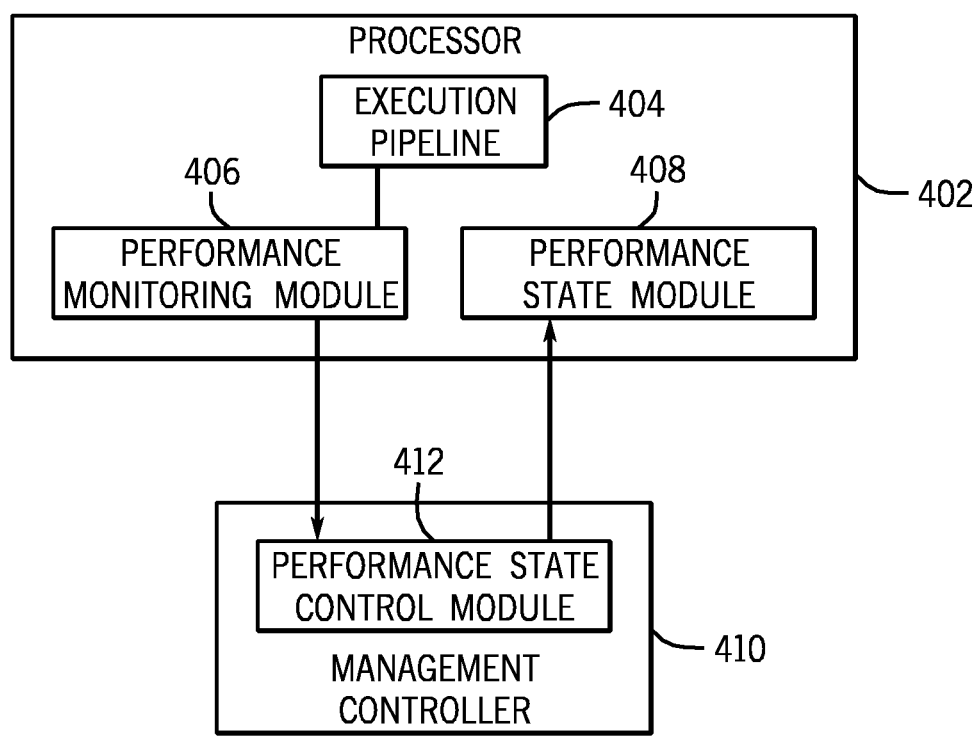
FIG. 4 is a block diagram of an electronic device according to alternative implementations.

FIG. 4 illustrates another arrangement for performing control of processor performance states, according to further implementations. In FIG. 4, a processor 402 includes an execution pipeline 404 (similar to the execution pipeline 108 or 204 of FIG. 1 or 2), and a performance monitoring module 406 to monitor at least one metric of the execution pipeline 404. In some examples, the performance monitoring module 406 can include the counter(s) 130 or 206 shown in FIG. 1 or 206, as well as other logic, such as logic to compute at least one metric (such as the metric referred to in task 302 of FIG. 3). The performance monitoring module 406 provides an output (which can include the at least one metric) to a performance state control module 412 executable in the management controller 410. The performance state control module 412 can perform the tasks of FIG. 3, for example.

A control indication can be provided from the performance state control module 412 to a performance state module 408, which can be part of the processor 402. The performance state module 408 can set a performance state of the processor 402 based on the control indication from the performance state control module 412. Although not depicted, the performance state module 408 can provide control signals to a power supply and/or a clock generator (similar to the power supply 112 and/or clock generator 114 of FIG. 1). In other examples the performance state module 408 can be omitted, with tasks of the performance state module 408 performed by the performance state control module 412, such as shown in FIG. 1.

In addition to improving overall performance of a processor by not consuming execution cycles of a processor's execution pipeline in performing processor performance state control, techniques or mechanisms according to some implementations can also reduce the amount of interrupts that are issued in an electronic device for the purpose of processor performance state control. For example, in implementations where BIOS code performs the processor performance state control, system management interrupts (SMIs) may be issued, which can consume processor resources. In some implementations, processor performance state control can be performed faster, such as with higher sampling rates, since such control is performed in a management controller that is independent of the processor's execution pipeline.

Machine-readable instructions of various modules discussed above (including modules 106, 210, 406, 408, and 412 of FIG. 1, 2, or 4) are loaded for execution on a processing circuit. Data and instructions are stored in respective storage devices, which are implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. An electronic device comprising:
   a processor having an execution pipeline and capable of executing at a plurality of performance states;
   a processing circuit independent of the processor; and
   machine readable instructions executable on the processing circuit to:
      monitor at least one metric relating to events of the execution pipeline of the processor, wherein the at least one metric is derived from a count of events of the execution pipeline, the events including instructions that have been retired by the execution pipeline in a given time interval;
      determine a current utilization of the processor based on the monitored at least one metric; and
      according to the determined utilization, cause the processor to transition from a first of the plurality of performance states to a second of the plurality of performance states.

2. The electronic device of claim 1, wherein the processing circuit is part of a management controller separate from the processor.

3. The electronic device of claim 2, wherein the management controller is part of a first integrated circuit chip, and the processor is part of a second, separate integrated circuit chip.

4. The electronic device of claim 1, further comprising a processor chip, wherein the processor is a processor core in the processor chip, and the processing circuit is part of the processor chip.

5. The electronic device of claim 4, wherein the processor core has the execution pipeline to execute instructions of a workload of the processor core, and the processing circuit is separate from the execution pipeline.

6. The electronic device of claim 1, further comprising a counter to count the events of the execution pipeline, wherein the at least one metric is derived from the count.

7. The electronic device of claim 6, wherein the events include clock cycles during which instructions are executed by the execution pipeline.

8. The electronic device of claim 7, further comprising a second counter to count clock cycles during which instructions are not executed by the execution pipeline, wherein the at least one metric is further derived from the count of the second counter.

9. The electronic device of claim 1, wherein the at least one metric is derived from a ratio of the count to a maximum number of instructions that could have been retired by the execution pipeline in the given time interval.

10. The electronic device of claim 1, further comprising a power supply to input a supply voltage to the processor, and a clock generator to output a clock signal to the processor, wherein the plurality of performance states correspond to different combinations of levels of the supply voltage and frequencies of the clock signal.

11. A method comprising:
    receiving a count, tracked by a counter, of events of an execution pipeline in a processor, wherein the events include instructions that have been retired by the execution pipeline in a given time interval;
    computing, by a performance state control module executing in a management controller that is independent of the processor, a current utilization of the processor based in the count; and
    according to the current utilization, transitioning the processor from a first of a plurality of performance states to a second of the plurality of performance states.

12. The method of claim 11, wherein the transitioning is performed by varying at least one selected from among a supply voltage level of a power supply, and a frequency of a clock signal from a clock generator.

13. The method of claim 11, wherein the management controller is separate from the execution pipeline of the processor.

14. The method of claim 11, wherein the count is tracked by the counter in the processor.

15. The method of claim 14, further comprising accessing the counter without interrupting the execution pipeline of the processor.

16. The method of claim 11, wherein computing the current utilization comprises comparing a metric derived from the count against at least one predefined threshold.

17. The method of claim 11, wherein the events include clock cycles during which instructions are executed by the execution pipeline.

18. An article comprising at least one machine-readable storage medium storing instructions that upon execution cause a controller to:
    monitor at least one metric relating to events of an execution pipeline of a processor that is independent of the controller, the events including instructions that have been retired by the execution pipeline in a given time interval;
    determine a current utilization of the processor based on comparing the at least one metric to at least one predefined threshold; and
    according to the determined utilization, cause the processor to transition from a first of the plurality of performance states to a second of the plurality of performance states.

* * * * *